May 10, 1927.

F. W. HALL 1,627,700

COIN COLLECTING APPARATUS FOR TELEPHONE SERVICES

Filed Nov. 28, 1924  5 Sheets-Sheet 1

FIG.1.

Inventor.
Frederick William Hall.
Attorney.

May 10, 1927.

F. W. HALL 1,627,700

COIN COLLECTING APPARATUS FOR TELEPHONE SERVICES

Filed Nov. 23, 1924 5 Sheets-Sheet 2

FIG.2.

Inventor.
Frederick William Hall.
Attorney.

Patented May 10, 1927.

1,627,700

UNITED STATES PATENT OFFICE.

FREDERICK WILLIAM HALL, OF LONDON, ENGLAND.

COIN-COLLECTING APPARATUS FOR TELEPHONE SERVICES.

Application filed November 28, 1924, Serial No. 752,732, and in Great Britain August 23, 1924.

The invention relates to coin collectors for telephone services, or the kind wherein the inserted coin is held in what may be called a position of suspense, from which it can be caused to take two alternative paths, namely a path to a till or coin receptacle incorporated with the apparatus or a path whereby it leaves the apparatus and can be recovered by the person who inserted ed it. In some devices of this kind heretofore known the holder on which the inserted money rests in the position of suspense is a balance arm, from which the money may be moved or projected to either of the alternative paths by a device, which may be called a coin projector, manually controlled by the subscriber by means of actuating devices accessible from outside the apparatus. The subscriber "cashes in", if he has received the required connection and desires to avail himself of it, or "cashes out" if the connection is not obtained.

According to my invention the operation of "cashing in" is initiated by an electrical device, which does not, however, supply the energy for moving the money to the "cashing in" path, but releases a lock which has previously restrained an automatic coin projector from projecting the coin to that path. In referring in this specification to "coin" in the singular, I use that term generally to cover also a plurality of coins constituting a payment for a call. I also intend the term "coin" to cover tokens which resemble minted coins but serve only as a medium of exchange for telephone services.

I may arrange that the coin acts on suitable coin signalling means, such as bells or gongs, to indicate its character or value to the exchange, the use of this auxiliary device being contemplated more particularly in cases where extra payments may be called for, as for long distance calls. There may, for example, be a plurality of chutes for accepting coins of different denominations, associated with sound signalling devices which produce or transmit sounds of different, distinctive characters.

An example of apparatus embodying my invention and designed for use, alternatively, with coins of three denominations, is shown in the accompanying drawing, in which.

Figure 1:
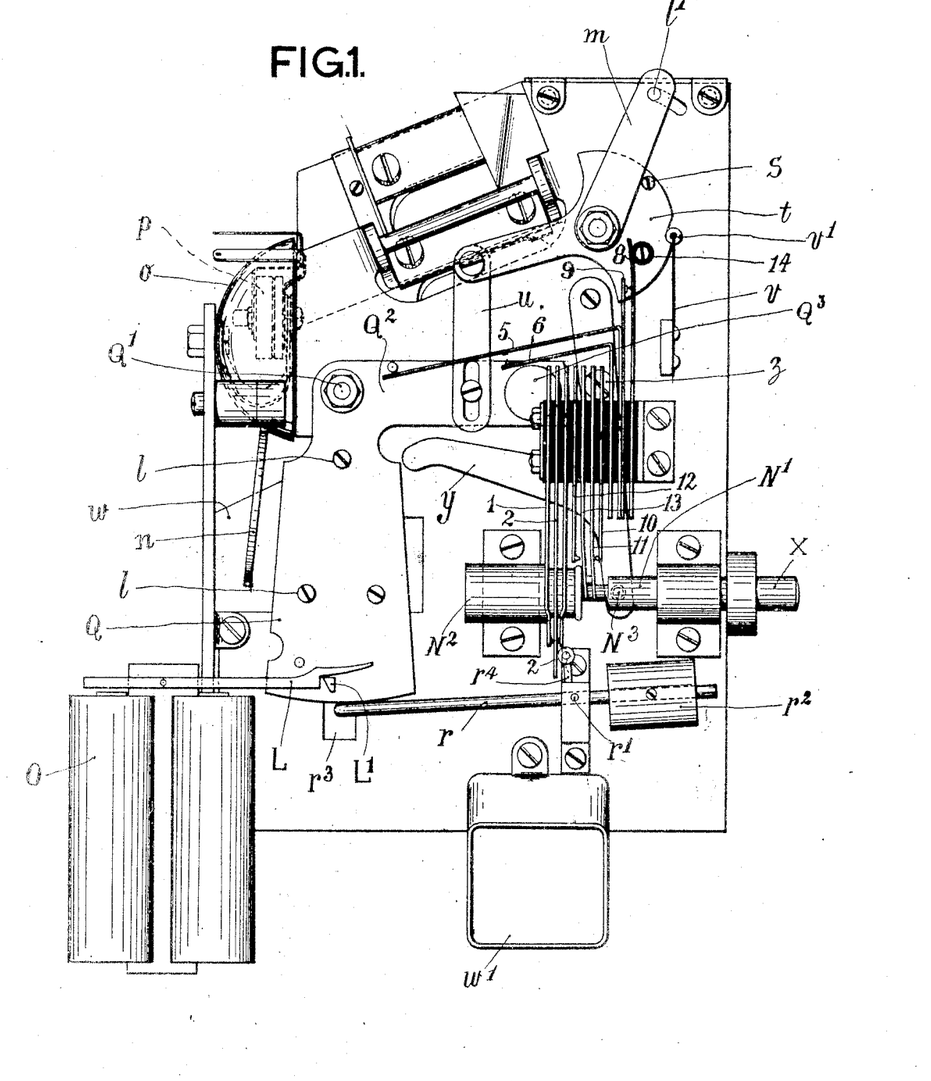
Fig. 1 is an elevation of the mechanism in the paybox,
Fig. 2 being a plan view of part of this mechanism.
Figure 2:
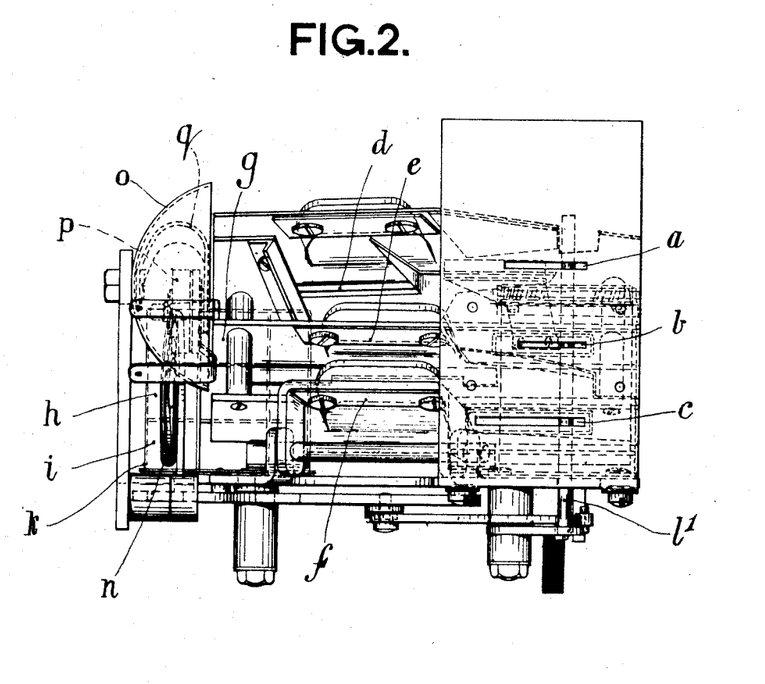

The mechanism shown in Figs. 1 and 2 is in practice enclosed in a box, which is not shown. At the top there is a plate with three coin slots $a$, $b$, $c$ of different sizes, for the respective coins, and the coins pushed through these slots travel down inclined chutes, $d$, $e$, $f$ respectively, and fall into the respective compartments $g$, $h$, $i$ of a coin carrier $k$ attached by screws $l$ to a quadrant $Q$, which is suspended from a pivot $Q^1$ and has a laterally projecting arm $Q^2$ weighted by a weight $Q^3$. In order to pass through the slot $a$, $b$ or $c$, each coin must push aside a pin $l'$ which projects into the chutes from a lever $m$, the purpose of which will be described hereinafter. Near the delivery ends of the chutes $a$, $b$, and $c$, there are a gong $n$ and a bell $o$, and fixed inside the bell there is a small auxiliary telephonic transmitter $p$. A coin passing from the chute $d$ to the compartment $g$ strikes a resilient yoke $q$ fixed to the bell. A coin passing from the chute $e$ to the compartment $h$ strikes the bell itself, and a coin passing from the chute $f$ to the compartment $i$ strikes the gong $n$. Thus each coin produces a sound of a different character, and these sounds or audible signals are transmitted to the exchange by the transmitter $p$ for a purpose to be described hereinafter. At the bottom of the compartment $i$ the coin comes to rest on the bent end of a balance arm $r$, which is pivoted at $r^1$ and is weighted by a weight $r^2$, so that the arm will be fully depressed to the bottom of a slot $r^3$ in the frame by the weight of the prescribed coin or coins. The bent end of the balance arm $r$ constitutes, in this embodiment of the invention, the device which I have referred to as the coin holder, holding the coin in the position of suspense.

The position in which the quadrant $Q$ is shown in Fig. 1 is not the position which it assumes normally by gravity, but is an unbalanced or biased position in which it is retained by a locking lever L engaging a projection L¹ on the quadrant. The weight Q³ tends to swing the quadrant to the left of Fig. 1. The rocking of the quadrant to the unbalanced position in which it is locked automatically by the lever L is effected manually by the subscriber who inserts the coin through the slot $a$, $b$ or $c$.

As already stated, the coin pushes aside the pin $l'$, which projects from the lever $m$, and the lever is thus rocked. The lever $m$ abuts against a screw $s$ projecting from the enlarged segmental end of a lever $t$, and thus rocks this lever, which is connected by a slotted link $u$ to the arm Q¹ of the quadrant Q, whereby the quadrant is moved to the unbalanced position in which it is shown in Fig. 1, and is locked automatically by the lever L. After the passage of the coin the levers $l'$ and $t$ are restored to normal position by a spring $v$ carrying a roller $v^1$ which bears against the segment.

The lever L is the armature of a polarized relay O, whereby the said lever can be disengaged from the projection L¹, to allow the quadrant to swing to the left of Fig. 1, whereby the coin resting on the bent end of the balance arm $r$ is displaced from the said arm and projected into the "cashing in" chute $w$. The manner in which the relay is energized will be described hereinafter.

A push-button $x$ projecting from one side of the box has a stem N¹ working in a dashpot N² and provided with a stud N³ engaging into a slot in a double armed lever $y$ pivoted at $z$ so that by pushing the button the lever is rocked and one of its arms lifts the arm Q² of the quadrant, and rocks the latter to the right of Fig. 1. If this is done the coin resting on the balance arm $r$ is displaced from the latter and projected into the "cashing out" or refund chute $w^1$, whereby it leaves the box and can be recovered by the subscriber.

Figure 3:
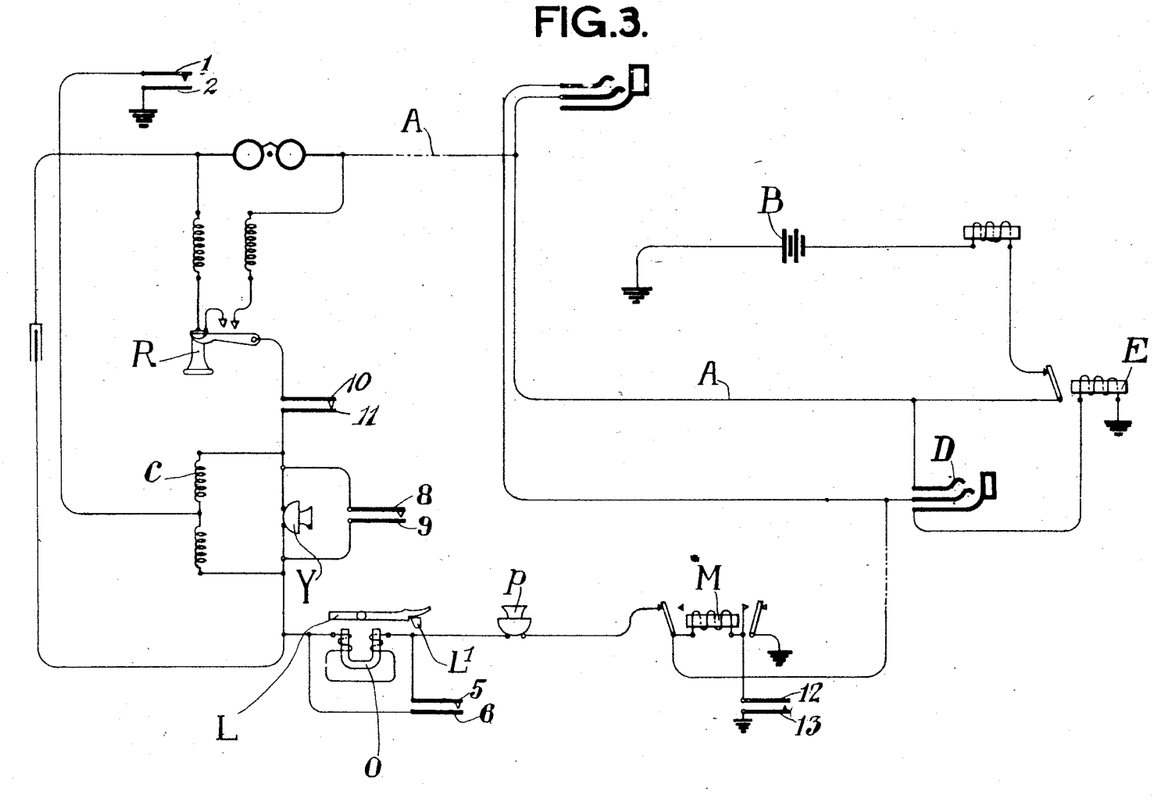
Figs. 3 and 4 are diagrams of the electric circuits associated with the apparatus.
Figure 4:
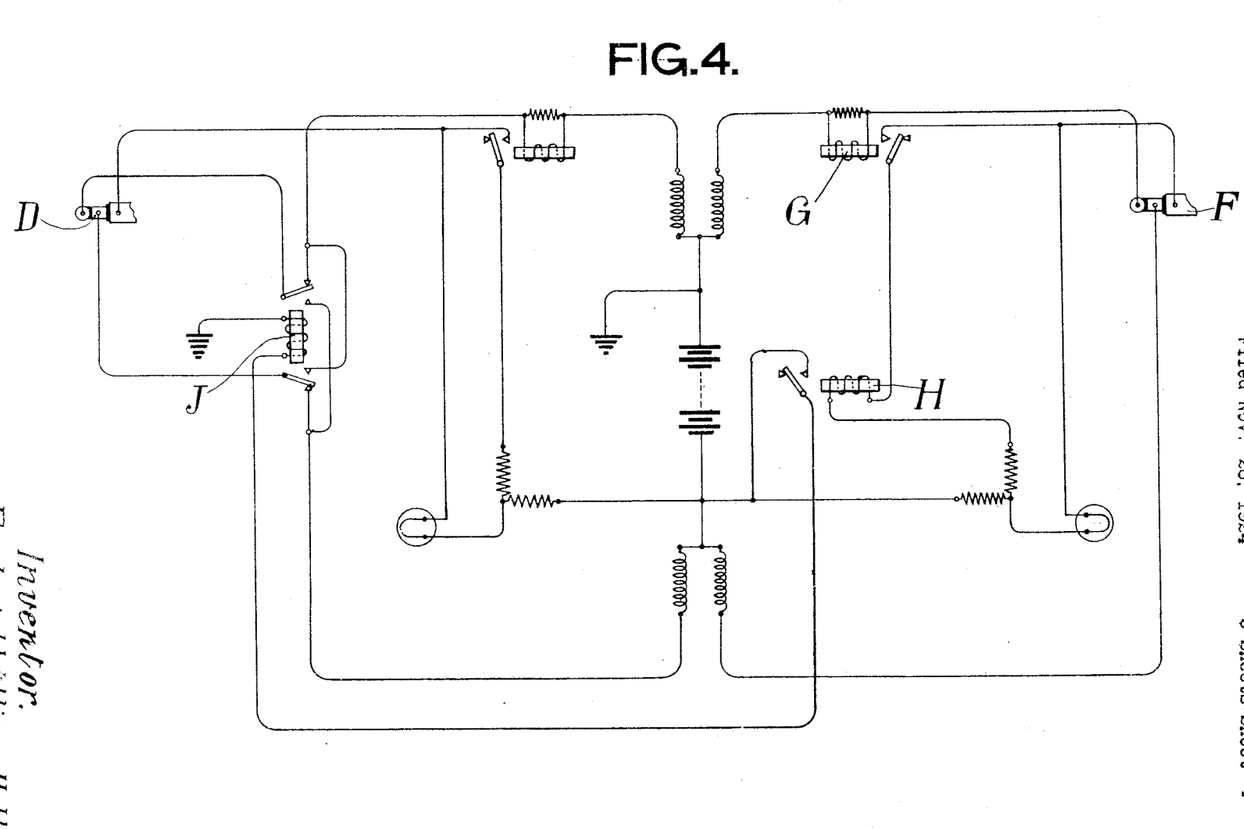
Figure 5:
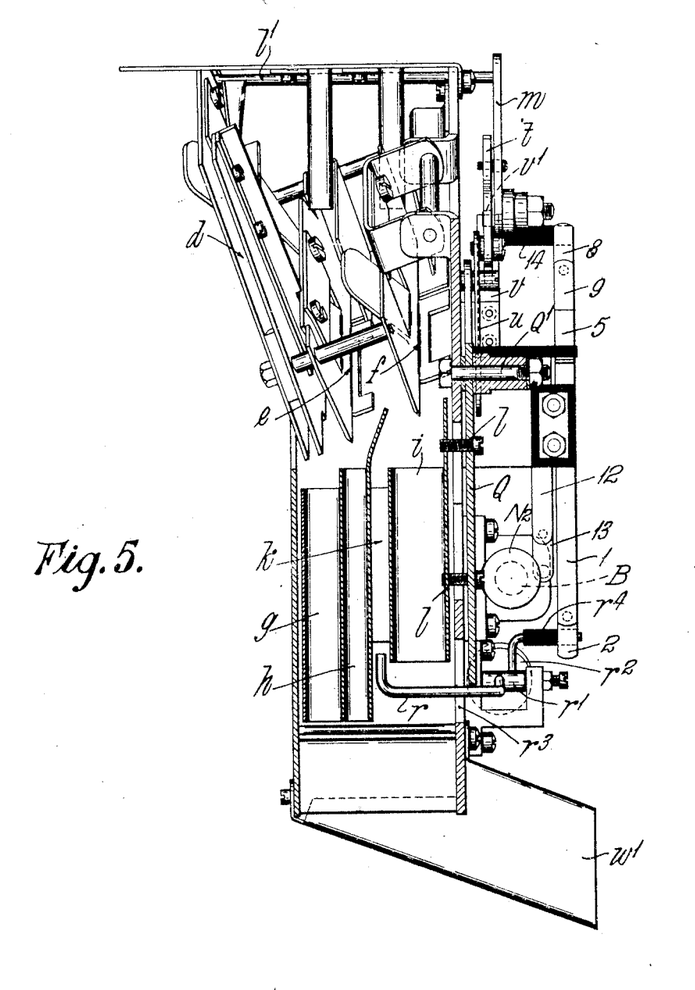
Figure 5 is a transverse sectional elevation.

It will be seen from Fig. 1 that the box mechanism includes a number of electric contacts, and I will now describe the operation of the apparatus, with reference to these contacts and to the circuit diagrams in Figs. 3 and 4. In describing the operation I shall first assume that the quadrant Q is not locked by the lever L, and is in the position which it assumes by gravity, that is to say is swung, to the left of the position shown in Fig. 1.

The insertion of a coin by the calling subscriber, temporarily closes a pair of contacts 8, 9 by means of a stud 14 on the lever $t$. This temporarily short circuits the subscriber's transmitter Y, and the link $u$ swings the quadrant Q towards the right of Fig. 1; when the coin has cleared the pin $l'$ the levers $m$ and $t$ return to normal position, the short circuit is broken, and the quadrant swings back towards the left, but is retained in the position shown in Fig. 1, by the locking lever L. The depression of the balance arm by the coin causes a lever $r^4$ projecting from the balance arm to close a pair of contacts 1 and 2. Then the removal of the receiver R from the hook establishes a circuit from the battery B through the line A, one half of a bridging coil C, and contacts 1 and 2 to earth, exchange being thus called. The operator plugs in the answering jack D, operating the cut-off relay E, and can then take the call. On being informed of the call required she plugs in the calling jack F and rings up the called party. When the called party lifts his receiver from its hook, current flows along his line, actuating the supervisory relay G on the calling side, which closes the circuit of an auxiliary relay H in the shunt of the supervisory lamp. This closes the circuit of a reversing relay J, which reverses the current in the line on the answering side, and causes the polarized relay O to disengage the lever L from the quadrant Q, so that the latter, swinging by gravity, projects the deposited coin into the chute $w$. By so swinging, the quadrant arm Q² closes a pair of contacts 5, 6, which short circuit the polarized relay.

Should an attempt be made to prevent the "cashing in" movement of the quadrant, by pressing a coin or implement against the pin $l'$, and thus restraining the quadrant by means of the link $u$, that action, by closing the contacts 8 and 9, will short circuit the transmitter, so that the instrument will be rendered unavailable for speaking.

In the event of the call being ineffective, the subscriber presses the button $x$ and swings the quadrant to the right, causing it to project the coin into the refund chute $w^1$. The movement of the button allows a pair of contacts 10, 11 to open, and close a pair of contacts 12, 13, which earth the coil of a holding relay M; this keeps the circuit disconnected till the operator has cleared the line.

As has already been mentioned, each coin inserted into the box strikes either the bell $o$ or the gong $n$. With normal payments the signal thus given is of no utility, because it is given before exchange has been called, but in the case of extra payments called for by the exchange operator, as for example for a long distance call, the signal enables the operator to check the payment.

What I claim as my invention and desire to secure by Letters Patent of the United States is:—

1. In coin collecting apparatus for telephone services the combination of a coin chute, an automatic movable device for projecting coins into said chute, an automatic locking device for restraining said coin projector from projecting coins into said chute adapted to move by gravity to deposit the coins, and electrically actuated means for releasing said coin projector.

2. In coin collecting apparatus for telephone services the combination of a coin holder, a coin chute, an automatic movable device for projecting coins from said coin holder into said chute adapted to move by gravity to deposit the coins, an automatic locking device for restraining said coin projector from projecting coins into said chute, and electrically actuated means for releasing said coin projector.

3. In coin collecting means for telephone services the combination of a coin holder, an intake chute for delivering coin to said coin holder, a coin chute for receiving coin from said coin holder, a second chute arranged to receive coin from said coin holder, a coin projector adapted automatically to project coin from said coin holder into the first mentioned chute adapted to move by gravity to deposit the coins, an automatic locking device for restraining said coin projector from projecting coins into said first mentioned chute, electrically actuated means for unlocking said locking device, and manually operated means for operating said coin projector to project coin from said coin holder to the second chute.

4. In coin collecting means for telephone services the combination of a coin holder, an intake chute for delivering coin to said coin holder, a coin receptacle for receiving coin from said coin holder, a refund chute arranged to receive coin from said coin holder, a gravity operated coin projector adapted automatically to project coin from said coin holder to said receptacle, an automatic locking device for restraining said coin projector from projecting coins into said receptacle, electrically actuated means for unlocking said locking device, and manually operated means for restoring said coin projector to the position of restraint after the automatic coin projecting operation.

5. In coin collecting means for telephone services the combination of a coin holder, an intake chute for delivering coin to said coin holder, a coin receptacle for receiving coin from said coin holder, a refund chute arranged to receive coin from said coin holder, a gravity operated coin projector adapted automatically to project coin from said coin holder to said receptacle, an automatic locking device for restraining said coin projector from projecting coins into said receptacle, electrically actuated means for unlocking said locking device, and means for restoring the coin projector to the position of restraint after the automatic coin projecting action, said restoring means including an actuating member which extends into said intake chute and is actuatable by the action of thrusting a coin into said chute.

6. In coin collecting apparatus for telephone services the combination of a pivotally suspended coin carrier, an automatic locking device for locking said coin carrier in an unbalanced position, a coin support for retaining coin in said carrier in said unbalanced position, and electrically actuatable means for unlocking said locking device.

7. In apparatus for the purpose set forth the combination of a telephone transmitter, a coin holder, an intake chute for delivering coin to said coin holder, a chute for receiving coin from said coin holder, a coin projector adapted automatically to project coin from said coin holder to said receiving chute, an automatic locking device for restraining said coin projector from projecting coin to said receiving chute, electrically actuated means for unlocking said locking device, and means actuatable by insertion of a coin into said intake chute for restoring said coin projector to the position of restraint and for rendering said transmitter temporarily inoperative.

8. In a coin collecting apparatus for telephone services, a pivoted coin projector adapted to move by gravity to a given position, means for moving said projector away from said given position, means for introducing a coin into said projector, detent means for holding said projector away from said given position, and electromagnetic means controlling said detent means.

9. In a device of the class described, a coin projector adapted to be energized by the insertion of a coin, a coin holder adapted to temporarily hold the coin, electromagnetic means for effecting movement of the projector to cash in a coin, and manually controlled means for moving the projector to return the coin.

10. In a device of the class described, a coin projector adapted to be energized by the insertion of a coin, a coin holder below the coin projector and adapted to retain the coin therein, electromagnetic means for effecting movement of the projector to cash in a coin, and manually controlled means for moving the projector to return the coin.

11. In a device of the class described, a coin projector in the form of a coin chute having means adapted to be energized by the insertion of a coin, a coin holder adapted to temporarily hold the coin, electromagnetic means for effecting movement of the projector to cash in a coin, and manually controlled means for moving the projector to return the coin.

12. In a device of the class described, a coin projector adapted to be energized by the insertion of a coin, a coin holder adapted to temporarily hold the coin, electromagnetic means for effecting movement of the projector to cash in a coin, manually controlled means for moving the projector to return the coin and circuit-changing means controlled by movement of the projector.

13. In a device of the class described, a coin projector adapted to be energized by the insertion of a coin, a coin holder adapted to temporarily hold the coin, electromagnetic means for effecting movement of the projector to cash in a coin, manually controlled means for moving the projector to return the coin, and circuit-changing means controlled by movement of the coin holder.

14. In a device of the class described and in combination a movable coin projector in the form of a chute, a balanced coin holder adapted in a given position of the projector to retain a coin therein, releasable means for retaining the projector in said given position, electromagnetic means for controlling the movement of the projector from said given position to cash in a coin and manually controlled means for moving the projector from said given position to return the coin to the operator.

15. In a device of the class described, a pivoted coin projector adapted to return to a given position when moved therefrom and to be moved from said given position by the insertion of a coin, a coin holder adapted to temporarily hold the coin, electromagnetic means for controlling movement of the projector to cash in a coin, and manually controlled means for moving the projector to return the coin.

16. In a device of the character described and in combination, a coin projector adapted to be moved to a given position by the insertion of a coin and tending when so moved to return to its normal position, a detent device adapted to retain said coin projector in said given position, a coin holder adapted to temporarily hold the coin in the coin projector when in said given position, electromagnetic means for controlling the movement of the projector one way from said given position to cash in a coin and manually controlled means for moving the projector the other way to return the coin to the operator.

17. In a device of the character described and in combination, a coin projector adapted to be moved to a given position by the insertion of a coin and tending when so moved to return to its normal position, a detent device adapted to retain said coin projector in said given position, a balanced coin holder adapted to temporarily hold the coin in the coin projector when in said given position, electromagnetic means for controlling the movement of the projector one way from said given position to cash in a coin and manually controlled means for moving the projector the other way to return the coin to the operator.

18. In a device of the class described, a coin projector adapted to be energized by the insertion of a coin, a coin holder adapted to temporarily hold the coin, electromagnetic means including a polarized relay for effecting movement of the projector to cash in a coin, and manually controlled means for moving the projector to return the coin.

19. In a device of the class described, a pivoted coin projector adapted to be energized by the insertion of a coin, a pivoted return lever operatively connected to the coin projector and manually operable means for actuating the said return lever, electromagnetic means for effecting movement of the projector to cash in a coin, and manually controlled means for moving the projector to return the coin.

20. In a device of the class described, a coin projector adapted to return to a given position when moved therefrom, a coin lever adapted to be actuated by the insertion of a coin and operatively connected to the coin projector and designed to move the coin projector to said given position and thereby energize the same upon the insertion of a coin, a coin holder adapted to temporarily hold the coin, electromagnetic means for effecting movement of the projector to cash in a coin, and manually controlled means for moving the projector to return the coin.

21. In a device of the class described, a pivoted coin projector, a coin lever adapted to be operated by the insertion of a coin, a lost-motion connection between the coin lever and the coin projector, a coin holder adapted to temporarily hold the coin, electromagnetic means for effecting movement of the projector to cash in a coin, and manually controlled means for moving the projector to return the coin.

22. In a device of the class described, a coin projector adapted to return to a given position when moved therefrom, a coin lever adapted to be actuated by the insertion of a coin and operatively connected to the coin projector and designed to move the coin projector to another given position and thereby energize the same upon the insertion of a coin, a coin holder adapted to temporarily hold the coin, electromagnetic means for effecting movement of the projector to cash in a coin, manually controlled means for moving the projector to return the coin and circuit-changing means operated by the coin lever.

23. In a device of the class described and in combination, a pivoted coin projector, a coin lever adapted to be moved by the insertion of a coin and operatively connected to the coin projector being designed to move the said coin projector to an energized position, a coin holder adapted to temporarily hold the coin in said projector, electromagnetic means for effecting movement of the projector to cash in a coin, manually controlled means for moving the projector to return the coin, circuit-changing means operated by the coin projector, circuit-changing means operated by the coin holder and circuit-changing means operated by the coin lever.

24. In a device of the class described, a pivoted coin projector having coin chutes for a plurality of coins, a coin holder adapted to temporarily hold a coin, electromagnetic means for effecting movement of the projector to cash in a coin, and manually controlled means for moving the projector to return the coin.

25. In a device of the class described, a plurality of coin chutes, a pivoted projector having a plurality of compartments corresponding to the coin chutes, a coin holder adapted to temporarily hold a coin, electromagnetic means for effecting movement of the projector to cash in a coin, and manually controlled means for moving the projector to return the coin.

26. In a device of the class described, a plurality of coin chutes, a pivoted projector having a plurality of compartments corresponding to the coin chutes, a coin holder adapted to temporarily hold a coin, electromagnetic means for effecting movement of the projector to cash in a coin, manually controlled means for moving the projector to return the coin, a single coin lever extending across all of the said coin chutes designed to be operated by the insertion of a coin, and circuit-changing means operated by the coin lever.

27. In a device of the class described, a coin projector adapted to be energized by the insertion of a coin, a coin holder adapted to temporarily hold the coin, electromagnetic means for effecting movement of the projector to cash in a coin, manually controlled means for moving the projector to return the coin, a coin lever designed to be actuated by the insertion of a coin and circuit-changing means actuated by said coin lever.

28. The combination with a telephone sub-station for a calling line and a sub-station for a called line and a usual supervisory circuit, of a coin-controlling device including a coin projector adapted to be energized by the insertion of a coin, a coin holder adapted to temporarily hold the coin, means controlled by the supervisory circuit for effecting movement of the projector to cash in a coin, and manually controlled means for moving the projector to return the coin.

29. The combination with a telephone sub-station for a calling line and a sub-station for a called line and a usual supervisory circuit, of a coin-controlling device including a coin projector adapted to be energized by the insertion of a coin, a coin holder adapted to temporarily hold the coin, means controlled by the supervisory circuit for effecting movement of the projector to cash in a coin, said means including a polarized relay, and manually controlled means for moving the projector to return the coin.

30. In a device of the class described, a coin projector in the form of a loaded quadrant adapted to be energized by the insertion of a coin, a coin holder adapted to temporarily hold the coin, electromagnetic means for effecting movement of the projector to cash in a coin, and manually controlled means for moving the projector to return the coin.

31. In a device of the class describied, a coin projector adapted to be energized by the insertion of a coin, a pivoted coin holder designed to be depressed by a given number of coins, electromagnetic means for effecting movement of the projector to cash in a coin, manually controlled means for moving the projector to return the coin and circuit-changing means operated by movement of the coin holder.

32. In a device of the class described, a coin projector adapted to be energized by the insertion of a coin, a coin holder adapted to temporarily hold the coin, electromagnetic means for effecting movement of the projector to cash in a coin, manually controlled means for moving the projector to return the coin, and sound signalling means operated by the passage of the coin through the device.

33. In a device of the class described, a coin projector adapted to be energized by the insertion of a coin, a coin holder adapted to temporarily hold the coin, electromagnetic means for effecting movement of the projector to cash in a coin, manually controlled means for moving the projector to return the coin, sound signalling means operated by the passage of the coin through the device, and an auxiliary transmitter for said sound signalling means.

34. In a device of the class described and in combination, a coin chute, a pivoted coin projector adapted to return to normal position when moved therefrom and designed to be moved to a given position by the insertion of a coin, a detent device adapted to retain the projector in said given position, electromagnetic means for releasing said detent, a pivoted coin holder adapted to temporarily hold the coin in the projector when in said given position, circuit-controlling means actuated by movement of the projector, and circuit-controlling means operated by movement of the coin holder.

35. In a device of the class described and in combination, a coin chute, a pivoted coin projector adapted to return to normal position when moved therefrom and designed to be moved to a given position by the insertion of a coin, a detent device adapted to retain the projector in said given position, electro-magnetic means for releasing said detent, a pivoted coin holder adapted to temporarily hold the coin in the projector when in said given position, circuit-controlling means actuated by movement of the projector, circuit-controlling means operated by movement of the coin holder, and manually controlled means for moving the projector to return the coin.

In witness whereof I have signed this specification.

FREDERICK WILLIAM HALL.